July 3, 1956
H. W. TREVASKIS ET AL
2,753,137
BRAKING SYSTEM FOR AIRCRAFT, INCLUDING
DELAYED RELEASE OF RETRACTED WHEELS
Filed May 18, 1954
4 Sheets-Sheet 4
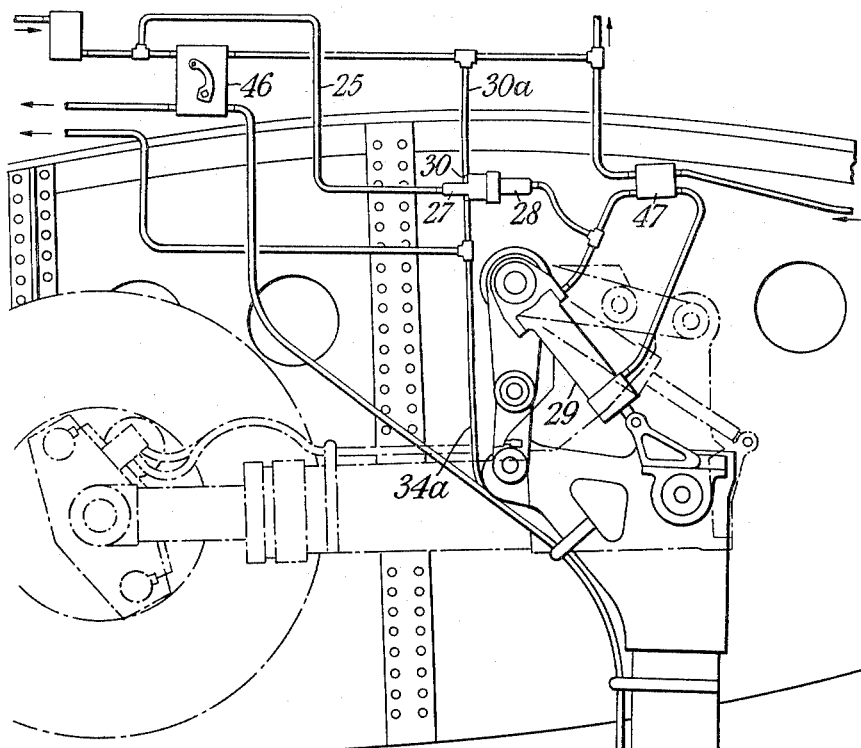
*Fig.5*
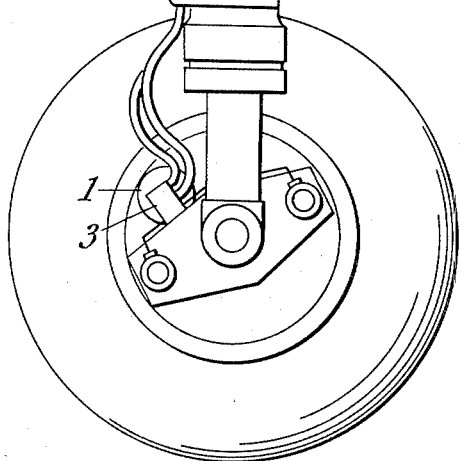

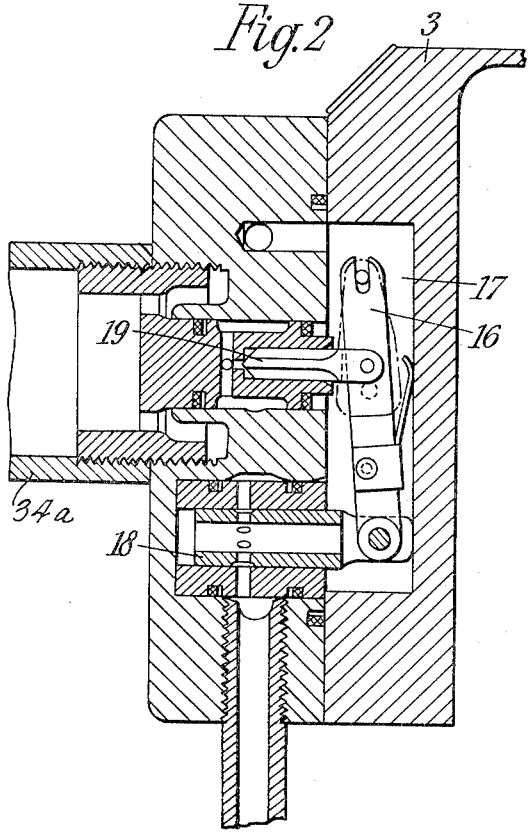
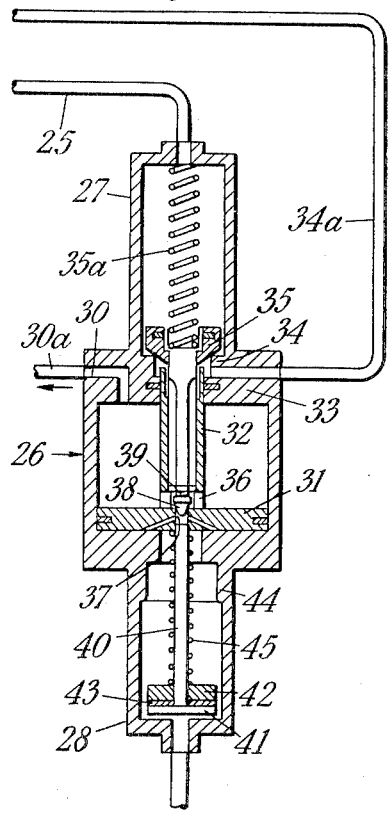

United States Patent Office 2,753,137
Patented July 3, 1956

2,753,137

BRAKING SYSTEM FOR AIRCRAFT, INCLUDING DELAYED RELEASE OF RETRACTED WHEELS

Henry William Trevaskis, Solihull, and Frank Radcliffe Mortimer, Stivichale, Coventry, England, assignors to Dunlop Rubber Company Limited, London, England, a British company Application May 18, 1954, Serial No. 430,647

Claims priority, application Great Britain May 30, 1953

14 Claims. (Cl. 244—111)

This invention relates to fluid pressure operated braking systems for aircraft having retractable undercarriages.

In our co-pending application Serial No. 317,522, now Patent No. 2,723,090, a braking system for aircraft of the above type is described comprising an automatic brake control apparatus, means to prevent the brakes from being applied before the landing wheels rotate and means associated with retraction of the undercarriage to automatically pressurize the brakes during flight, and to release the brakes on lowering of the undercarriage and so permit normal application of the brakes, e. g. through a pilot's control.

Whilst it is desirable that the wheels should be automatically braked during retraction of the undercarriage after the aircraft has taken off, to prevent them spinning when retracted, it is not always desirable that they should be kept braked during the flight of the aircraft, since it is undesirable to have the brake operating mechanisms, pressure lines and the like pressurized for long periods at a time. It is therefore the object of the present invention to provide a braking system wherein, on retraction of the undercarriage, the brakes are automatically pressurized for a predetermined duration only, which is sufficient to stop the wheels spinning after the aircraft has taken off.

According to the present invention a braking system for aircraft having fluid-pressure operated brakes and a retractable undercarriage comprises means associated with the retraction of the undercarriage to close the fluid pressure line from the pilot's control to the brakes and to apply braking pressure automatically, means to automatically release the braking pressure after a predetermined period of time and means associated with the rotation of the aircraft wheels on landing to open said fluid pressure line and permit normal application of the brakes through the pilot's control.

The means associated with retraction of the undercarriage to close the fluid pressure line from the pilot's control to the brakes and to apply braking pressure automatically ocmprises a fluid-filled housing connected to a source of fluid pressure and to the retraction side of the jack controlling movement of the undercarriage. On pressurizing this side of the jack to raise the undercarriage a piston in the housing is moved to open a spring-loaded valve and allow pressure fluid from the source to flow into the housing and thence to a device for closing the inlet valve and operating the exhaust valve of a valve mechanism operatively connected to the wheel brakes and, through a pilot's control, to a source of fluid pressure. The exhaust valve is operatively connected with the housing so that fluid pressure flows from the housing to the exhaust and thence to the wheel brakes to brake the wheel.

The means to release the braking pressure automatically after a predetermined period of time comprises a restrictor valve inserted in said piston, whereby pressure fluid can leak therethrough to a fluid reservoir, when said piston will move to allow the spring-loaded valve to close and to connect the exhaust valve in said valve mechanism to a fluid reservoir.

Preferably both said means are associated with apparatus for automatically controlling the braking pressure during the landing run and also with a centrifugally-operated device for preventing the application of the wheel brakes before the wheels rotate on landing.

The system of the present invention will now be described in conjunction with an automatic brake control apparatus which has associated therewith a device for preventing the application of the wheel brakes before the wheels rotate on landing, and the system and the material parts thereof are illustrated in the accompanying drawings of which:

Figure 2 is a section through a valve mechanism associated with the construction shown in Figure 1 and actuated thereby to control the flow of hydraulic fluid from a source to the wheel brakes.

Figure 3 is a section through a hydraulically-operated device associated with the construction of Figures 1 and 2, and illustrated in the position wherein the aircraft undercarriage is in the "down" position.

Figure 5 is a view of the system of the invention showing the manner in which it may be applied as an aircraft installation.

Figure 1:
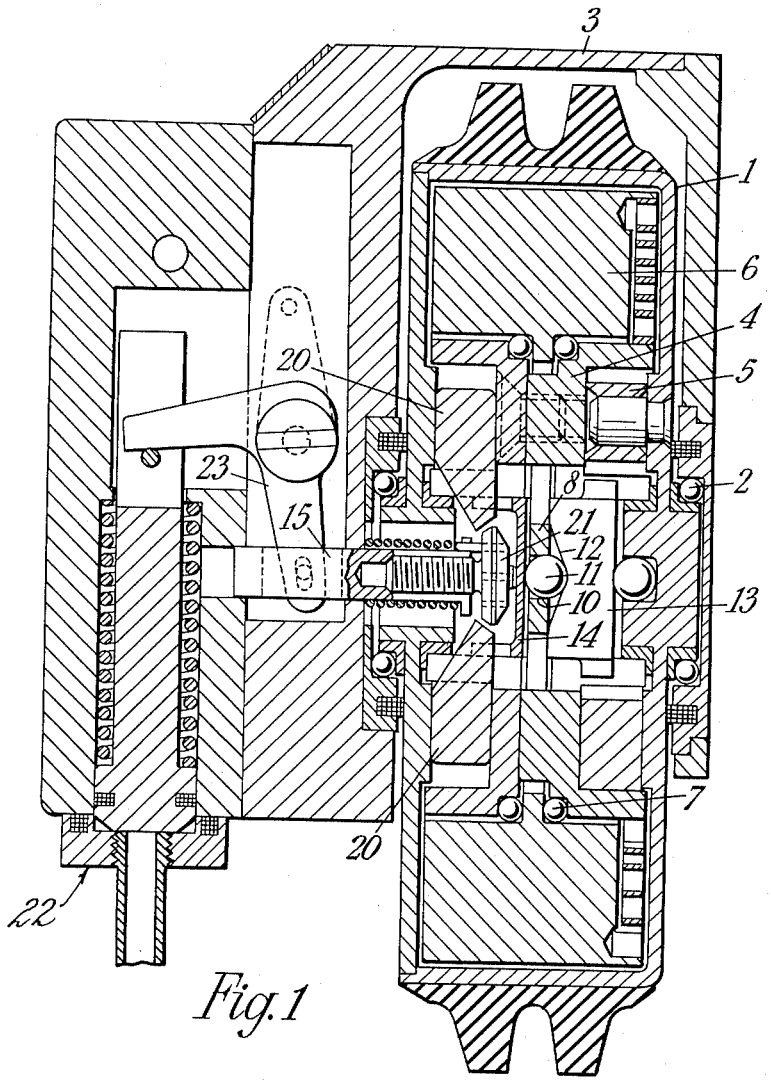
Figure 1 is a sectional view of an automatic braking apparatus with which is associated a device for preventing the application of the wheel brakes before the wheels rotate on touching down.

An automatic braking apparatus (Figure 1) comprises a cylindrical housing 1 rotatable by an associated landing wheel on bearings 2, within a non-rotatable bracket 3, an annular drum-member 4 rotatable within the housing 1, a clutch mechanism 5 driving the drum-member 4 from the housing 1 and an annular flywheel 6 rotatable on bearings 7 between the outer periphery of the drum-member 4 and the inner periphery of the housing 1. A beam 8 extends diametrically across the inner periphery of the flywheel, on the median plane thereof, and through arcuate, diametrically-opposed slots in the drum-member. Relative angular movement of the drum-member 4 and flywheel 6 is thus restricted. A hole 10 is provided on each side of the centre of the flywheel beam 8, and in each hole is located a ball 11 which is seated in a shallow slot 12 of V-section extending across one face of a cam-member 13 which is associated with the drum-member 4 and is rotatable therewith. A disc 14 is located on the other side of said beam 8 and one end of a spring-loaded operating rod 15 abuts said disc. A valve beam 16 (Figure 2), operatively connected to said operating rod 15, is located in a pressure chamber 17 connected to the hydraulically-operated wheel brakes, and an inlet valve 18 and an exhaust valve 19, communicate with the pressure chamber 17 and are operatively associated with the valve beam 16, the inlet valve 18 also communicating with a source of hydraulic pressure and the exhaust valve 19 with a liquid reservoir.

The operating rod 15 is spring-loaded into a position in which the inlet valve 18 is open and the exhaust valve 19 closed, so that hydraulic pressure can flow into the pressure chamber 17 and thence into the brakes. If the landing wheel should slip or skid, however, the housing 1 is decelerated thereby and relative angular movement takes place between the flywheel 6 and drum-member 4. This causes the balls 11 in the flywheel beam 8 to run up the sides of the slots 12 in the cam-member 13, thus moving the disc 14 and operating rod 15 away from the beam 8. Movement of the operating rod in this direction first closes the inlet valve 18 and then opens the exhaust valve 19 to remove the braking pressure and thus avert the sliding or skidding condition of the wheel. This apparatus, and the way in which it operates is fully described and claimed in our patent specification No. 2,656,017 and is also described in our co-pending application Serial No. 317,522, now Patent No. 2,723,090.

Associated with said apparatus is a device for preventing the application of the brakes before the landing wheels rotate. This device comprises a pair of centrifugal releases 20 (Figure 1) rotatable with the drum-member 4 and spring-loaded inwardly to engage behind an annular member 21 secured to one end of the operating rod 15. A spring-loaded piston and cylinder mechanism 22 is provided, and a cranked lever 23 is provided between the said piston and the operating rod 15, whereby pressurization of the said cylinder moves the piston against its spring to move the cranked lever 23 and so move the operating rod 15 axially into a position in which the inlet valve 18 is closed and the exhaust valve 19 open. The annular member 21 at the end of the operating rod 15 is drawn between the centrifugal releases 20, which then move inwardly once more to trap the annular member 21 behind them. The brakes thus cannot be applied until the wheels rotate on landing at a predetermined angular velocity, when the centrifugal force will overcome the force of release springs and allow the releases 20 to fly outwardly. The annular member 21 and operating rod 15 then move back again into a position in which the inlet valve 18 is open and the exhaust valve 19 is closed, and the brakes may be applied. This device is more fully described in our co-pending application Serial No. 317,522, now Patent No. 2,723,090, whilst another embodiment of the same device is described and claimed in our patent specification No. 2,656,017.

Figure 4:
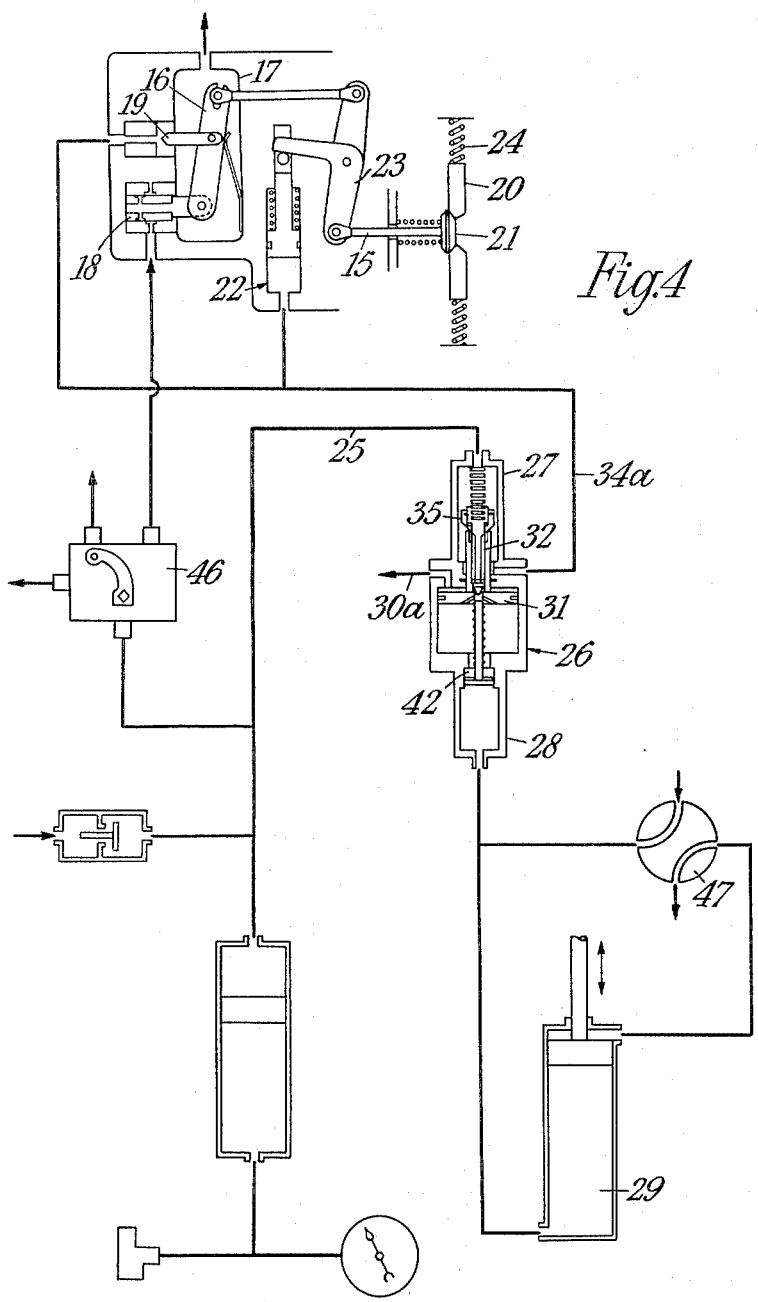
Figure 4 is a diagrammatic layout of a braking system incorporating the construction of Figures 1, 2 and 3 and illustrated in the position wherein the aircraft undercarriage is in the "up" position.

The inlet valve 18 (Figure 4) of the valve mechanism, hereinabove described, is connected through a pilot's control valve 46 with a source of hydraulic pressure. Another pressure line 25 leads from the same source of hydraulic pressure and is connected to a hydraulically-operated device (Figure 3) which comprises a cylindrical housing 26 having tubular portions 27, 28 extending coaxially from each end thereof. The upper tubular portion 27 is connected to the pressure line 25 leading to the source of hydraulic pressure and the lower tubular portion 28 is connected to the retraction side of the jack 29 controlling the raising and lowering movement of the undercarriage. The upper end of the cylindrical housing 26 is provided with a connection 30 leading, through line 30a, to a liquid reservoir.

A piston 31 is fluid-tightly and slidably fitted in the cylindrical housing 26, said piston being provided with a hollow stem 32 extending axially from one side thereof, and said stem 32 extends liquid-tightly through an aperture in a wall 33 dividing the housing 26 from the upper tubular portion 27, and into said upper tubular portion. The upper tubular portion 27 is provided, adjacent its lower end, with an inwardly formed annular shoulder 34, and the space between said shoulder 34 and the lower end of the upper tubular portion 27 is connected by a conduit 34a to the exhaust valve 19 of the automatic braking apparatus and also to the piston and cylinder mechanism 22 of the "cocking" device associated therewith.

The end of the hollow piston stem 32 remote from the piston 31 is formed as a valve seat, and a frusto-conical valve member 35 is located within the upper tubular portion 27, a part thereof being adapted to seat on the inwardly formed shoulder 34 of the said portion and another part being adapted to seat on the end of the hollow piston stem 32. The valve member 35 is urged downwardly by spring 35a to normally seat on the inwardly formed shoulder 34 which together with the valve member 35 acts as an inlet valve. With the piston 31 seated on the bottom end of the housing 26 the valve seat end of the hollow stem 32 which, together with the valve member 35, forms an exhaust valve, is spaced away from said valve member, and with the exhaust valve open liquid under pressure can flow therethrough from the space between the shoulder and the bottom of the upper tubular portion down the hollow stem 32 and through holes 36 at the end thereof adjacent the piston 31 and into the housing 26 on the upper side of the piston.

The piston 31 is provided centrally with a hole 37 extending axially therethrough and a tapered plug-type restrictor 38 is fitted in said hole 37, said restrictor 38 being provided with a threaded portion 39 screwed to the hollow stem 32, whereby the clearance can be adjusted to allow a predetermined volume of pressure liquid through the hole 37 in unit time.

A rod 40 is fitted centrally to that face of the piston 31 remote from the hollow stem 32 and extends axially therefrom and into the lower tubular portion 28. The end thereof remote from the piston 31 is formed with an outwardly extending flange 41. Slidably fitted on the rod 40 is a plug 42 provided with a sealing ring 43, and this plug 42 is adapted to fit into a smaller-diameter part 44 of the lower tubular portion 28 adjacent its upper end, and when so fitted makes a liquid-tight seal therein and also makes a liquid-tight seal with the rod 40. A spring 45 is fitted between the piston 31 and the plug 42 to normally force the plug 42 against the flange 41 at the end of the rod, and the housing and tubular extensions are completely filled with hydraulic liquid.

With the aircraft standing on the runway, the device for preventing application of the brakes is "uncocked," i. e. as shown in Figures 1 and 2 the operating rod 15 is not trapped in the inoperative position by the centrifugal releases 20, and the inlet valve 18 of the automatic braking apparatus is open and the exhaust valve 19 closed. The pilot's control valve 46, however, is so operated to prevent the flow of hydraulic pressure through the inlet valve 18 to the brake.

The piston 31 of the hydraulically-operated device is seated on the bottom of the housing 26 as in Fig. 3 under the action of hydraulic liquid returning to the reservoir from the exhaust valve 19, and the plug 42 abuts the flange 41 under the action of its associated spring. The inlet valve is shut, i. e. valve member 35 is seating on the annular shoulder 34, thus preventing entry of liquid under pressure from the source into the space connected to the exhaust valve 19 and the valve seat end of the hollow stem 32 is spaced a short distance away from the valve member 35, so that said space, which is connected to the cylinder of the device for preventing the application of brakes and to the exhaust valve of the valve mechanism, is also connected, through the holes 36 in the hollow stem 32, to the interior of housing 26 and thence to the liquid reservoir.

In Figure 5 the system is shown as applied to one of two retractable undercarriage strut and wheel assemblies, one on each side of the aircraft. The control valve 46 and the hydraulically-operated device comprising the cylindrical housing 26, however, are not duplicated but instead the control valve 46 and the conduit 34a both have a connection to the system associated with the opposite wheel and strut.

The aircraft takes off in the normal way, and with the aircraft airborne, the pilot operates a control 47 (Figure 4) to connect the retraction or raising side of the jack 29 controlling the movement of the undercarriage to a source of hydraulic pressure, and the extension or lowering side with a liquid reservoir. The retraction side of the jack is connected to the lower tubular portion 28 of the hydraulically-operated device, and hence as the retraction side of the jack is pressurized and the undercarriage raised, so the hydraulic pressure from the source flows into the said portion 28 and forces the piston 31 upwardly until, when the piston is at a location adjacent the top of the housing 26 the tapered plug 42, which moves upwardly with the piston, is located within the smaller diameter part 44 of the lower tubular portion, thus sealing off the lower tubular portion 28 from the housing 26. The hollow stem 32 also moves upwardly with the piston 31, the valve seat end first abutting the valve member 35 to close the exhaust valve and then moving the valve member off its seating on the inwardly formed annular shoulder 34 to open the inlet valve against the valve return spring 35a and against the force of the pressure from the source in the upper tubular portion 27. Hydraulic pressure from the source thereupon flows through the inlet valve, into the space below the annular shoulder 34 and thence into the cylinder of the device for preventing the application of brakes and to the exhaust valve 19 of the valve mechanism. The piston of the piston and cylinder mechanism 22 is moved by said pressure upwardly against its spring to move the cranked lever, which in turn pulls the annular member 21 at the end of the operating rod 15 through the centrifugal releases 20, which deflect outwardly to allow its passage and then move inwardly again to lock it in position. In this position of the operating rod the inlet valve 18 is closed and the exhaust valve 19 open, and hydraulic pressure in the upper tubular portion 27 of the hydraulically-operated device can flow through the exhaust valve 19, into the pressure chamber 17 of the valve mechanism and thence into the brake operating mechanisms to apply the brakes and stop the wheels spinning.

Hydraulic liquid from the high-pressure side of the piston 31, i. e. the lower side, leaks past the plug-type restrictor 38 and through the hole 37 in the piston 31 to the lower pressure side, whence it flows to the reservoir. As the volume on the lower side of the piston thus gradually decreases, so the piston 31 is forced progressively downwardly once more mainly under the action of the hydraulic pressure from the source acting downwardly on the effective area of the stem. As the piston moves downwardly the rod 40 secured thereto also moves downwardly. The tapered plug 42, however, which is a liquid-tight fit in the smaller diameter part 44 of the lower tubular portion is retained in position in said part by the pressure in the lower tubular portion 28 for as long as the pressure is retained in said portion, i. e. for as long as the retraction side of the jack 29 is connected to the source of pressure. As the piston 31 slowly descends the spring 45 between the plug 42 and the piston 31 is compressed.

The exhaust valve of the hydraulically-operated device is maintained closed by the spring 35a in the upper tubular portion 27 and as the piston 31 approaches its original position at the lower end of the housing 26 the valve member 35 seats once more on the annular shoulder 34 in the said upper portion, thus closing the inlet valve and cutting off the pressure from the source. Further movement of the piston stem 32 opens the exhaust valve and liquid under pressure from the said "cocking" device and from the valve mechanism flows back through said exhaust valve, down the hollow stem 32 and through the holes 36 at one end thereof into the casing at the upper side of the piston, whence it flows back to the reservoir.

The braking pressure at the wheel brakes is thus removed a predetermined time after its application, and this period of time is determined by the amount of pressure liquid passing through the restricted orifice in the piston 31 in unit time. As soon as the retraction side of the jack is connected to exhaust or the lowering side of the jack is pressurized the lower tubular portion is depressurized and the tapered plug is free to move downwardly under the action of its spring until it once more abuts the flange at the end of said piston rod.

The time during which the brakes are automatically applied to prevent spinning of the wheels as the aircraft takes off is largely a function of the amount of liquid that the rectrictor will pass in a predetermined time. Thus the time during which the brakes are applied may be varied as convenient.

Having described our invention, what we claim is:

1. A braking system for aircraft which comprises fluid pressure operated brakes, a retractable undercarriage, means actuated by the retraction of the undercarriage to close the fluid pressure line from the pilot's control to the brakes and to apply braking pressure, means to automatically release the braking pressure after a predetermined period of time and means actuated by rotation of the aircraft wheels on landing to open said fluid pressure line and permit normal application of the brake through a pilot's control.

2. A braking system for aircraft according to claim 1 comprising means to raise and lower the undercarriage wherein the means actuated by the retraction of the undercarriage comprises a housing connected to a source of fluid pressure, to said means for raising and lowering the undercarriage and to the fluid pressure operated device for closing the fluid pressure line from the pilot's control to the brakes and for applying braking pressure automatically, and a piston slidable in the housing on retraction of the undercarriage to place the source of fluid pressure in communication with the device.

3. A braking system for aircraft according to claim 2 wherein the means actuated by the rotation of the aircraft wheels comprises an inlet valve and an exhaust valve controlling the flow of pressure fluid between the pilot's control and a pressure chamber interposed between said control and said wheel brakes, a cylinder and a piston slidable therein against a spring load, a lever mechanism actuated by said piston and operatively associated with said inlet and exhaust valves to thereby close said inlet valve and open said exhaust valve, an inwardly spring loaded centrifugally releasable latch, an operating rod secured to said lever mechanism and movable axially in one direction by said lever mechanism through said inwardly spring-loaded centrifugally releasable latch, whereby movement in the other direction is prevented until rotation of the wheel on landing of the aircraft forces said centrifugally releasable latch outwardly to release said operating rod and permit the inlet valve to open.

4. A braking system according to claim 1 wherein the means to automatically release said braking pressure after a predetermined period of time comprises a restrictor valve controlling a passage in said piston slidable in said housing whereby the rate of flow of pressure fluid from one side of said piston to the other is controlled.

5. A braking system for aircraft according to claim 4 wherein the housing comprises a cylindrical portion having a tubular portion extending axially from each end thereof, said housing being connected to a fluid reservoir and to the exhaust valve of said valve mechanism directly associated with the aircraft wheel brakes, a piston having a hollow stem extending axially from one of its faces and a rod extending axially from the other of said faces, a flange at the end of said rod remote from said piston, an annular plug slidable on said rod and spring-urged into contact with said flange, a valve member adapted to form an exhaust valve with one end of said hollow stem and adapted to form an inlet valve with an annular abutment formed in one of said tubular members and spring means to close the inlet valve.

6. Pressure fluid control valve mechanism for hydraulic brakes which comprises a cylinder having a port at one end and having cylindrical extensions from each end and openings from said cylinder into each said extension, a piston slidable in said cylinder, said piston having a restrictor opening therethrough, a hollow stem extending from one side of said piston about said opening and slidable fluid tightly by said piston through the opening into one extension, a valve in said extension spring pressed to seat in said opening in position to be raised therefrom by said hollow stem and to close said hollow stem, a restrictor adjustably secured to control the passage of fluid through said restrictor opening, said extension having a port above said valve and a port below said valve, the opposite extension of said cylinder having an inlet port, a stem extending from said piston through the opening into said opposite extension and having a supporting flange within said extension, a plug slidable on said stem and supported on said supporting flange to be carried thereby to close the opening from said extension into said cylinder when said piston is moved in one direction and a spring confined between said plug and said piston.

7. A braking system for aircraft having fluid pressure operated brakes and a retractable undercarriage comprising means responsive to retraction of the undercarriage to close the fluid pressure line from the pilot's control to the brakes and to supply braking pressure automatically, a restrictor valve to permit the eventual release of said braking pressure, and means responsive to rotation of the aircraft wheels on landing to open said fluid pressure line and permit normal application of the brakes through the pilot's control.

8. A braking system for aircraft according to claim 7 comprising fluid pressure operated means for raising and lowering the undercarriage and wherein the means responsive to retraction of the undercarriage comprises a housing connected to a source of fluid pressure, to the fluid pressure operated means for raising and lowering the undercarriage and to a fluid pressure operated device for closing the fluid pressure line from the pilot's control to the brake and for applying braking pressure automatically, and a piston slidable in the housing on retraction of the undercarriage to place the source of fluid pressure in communication with the device.

9. A braking system for aircraft according to claim 8 wherein the means responsive to rotation of the aircraft wheels comprises an inlet valve and an exhaust valve controlling the flow of pressure fluid between the pilot's control and a pressure chamber interposed between said control and said wheel brakes, a cylinder, a piston slidable therein against a spring load to actuate a lever mechanism to thereby close said inlet valve and open said exhaust valve, an operating rod secured to said lever mechanism and movable axially in one direction against a spring load by said lever mechanism through an inwardly spring-loaded centrifugal release, whereby movement in the other direction is prevented until rotation of the wheel on landing of the aircraft forces said centrifugal release outwardly to release said operating rod and permit the inlet valve to open.

10. A braking system for aircraft according to claim 9 wherein said housing is connected to the exhaust valve of said pressure chamber and to said piston and cylinder mechanism, whereby on retraction of said undercarriage pressure fluid from the source flows through said housing to actuate said piston and cylinder mechanism, and to said exhaust valve to operate the brakes when said exhaust valve is opened.

11. A braking system according to claim 10 wherein the restrictor valve co-operates with a hole in said piston slidable in said housing whereby the rate of flow of pressure fluid from one side of said piston to the other is controlled.

12. A braking system for aircraft according to claim 11 wherein said restrictor valve comprises a taper plug coaxially aligned with said hole in the piston and adjustable relative thereto.

13. A braking system for aircraft according to claim 12 wherein the housing comprises a cylindrical portion having a tubular portion extending axially from each end thereof, said housing being connected to a fluid reservoir and to the exhaust valve of said valve mechanism directly associated with the aircraft wheel brakes, a piston having a hollow stem extending axially from one of its faces and a rod extending axially from the other of said faces, a flange at the end of said rod remote from said piston, an annular plug slidable on said rod and spring-urged into contact with said flange, a valve member forming an exhaust valve with one end of said hollow stem and also forming an inlet valve with an annular abutment formed in one of said tubular members and spring means to close the inlet valve.

14. A braking system for aircraft according to claim 13 comprising a rotary-inertia automatic braking apparatus.

References Cited in the file of this patent

UNITED STATES PATENTS

| | | |
|---|---|---|
| 2,347,847 | Shnell | May 2, 1944 |
| 2,459,665 | Manjeri | Jan. 18, 1949 |
| 2,502,110 | Trevaskis | Mar. 28, 1950 |